Nov. 24, 1925.  1,563,046
J. E. SEARS, JR., ET AL
METHOD OF AND APPARATUS FOR MEASUREMENT AND/OR STANDARDIZATION
Filed Aug. 31, 1920    2 Sheets-Sheet 2

Inventors
J. E. Sears, Jr.
A. J. C. Brookes,
By H. R. Kerslake.
Attorney.

Patented Nov. 24, 1925.

1,563,046

UNITED STATES PATENT OFFICE.

JOHN EDWARD SEARS, JR., AND ARTHUR JOHN CHARLES BROOKES, OF TEDDINGTON, ENGLAND; SAID JOHN EDWARD SEARS, JR., ASSIGNOR TO SAID ARTHUR JOHN CHARLES BROOKES, OF BRIDGNORTH, ENGLAND.

METHOD OF AND APPARATUS FOR MEASUREMENT AND/OR STANDARDIZATION.

Application filed August 31, 1920. Serial No. 407,194.

*To all whom it may concern:*

Be it known that we, JOHN EDWARD SEARS, Junior, and ARTHUR JOHN CHARLES BROOKES, both subjects of the King of Great Britain and Ireland, and both residing at The National Physical Laboratory, Teddington, in the county of Middlesex, England, have invented a certain new and useful Improved Method of and Apparatus for Measurement and/or Standardization, of which the following is a specification.

This invention relates to methods of and apparatus for measurement or standardization of lengths.

The invention is distinguished from ordinary workshop practice involving the use of surface plates and levels in that while it is applicable to such comparatively coarse measurements as are involved in such practice it is capable of giving a much finer degree of accuracy of measurement than has ever before been attained by any known means say of the order of one-millionth part of an inch or even higher. It is further distinguished from such ordinary workshop practice in that while the latter gives only qualitative measurements the present invention in conjunction with the invention covered by our British Patent 141,770 can be utilized to provide any desired sub-divisional standard length bars in a positive quantitative sense provided that a single parent standard bar of known size as, for instance, a 36" bar is available no calibration of the instrument or reference to other external data being necessary.

The invention consists in a method of measurement or standardization by which the length of one article or bar can be compared directly with that of another article or bar of approximately equal size, one of which articles may be a standard length bar of previously determined length, and in conjunction with our other process of the aforementioned British specification No. 141,770, it is a means of obtaining any sub-divisional lengths of a primary standard, which are generated in terms of that same primary standard. These sub-divisional length bars become, in turn, standards of new known lengths for making further comparisons. The combined inventions thus afford a means of producing and measuring accurate sub-divisional standard length bars independently of any external calibration other than that of the original standard bar.

Comparison of lengths is made by placing the two articles to be compared (one of which may be a standard bar) side by side in a vertical position upon a suitable table upon which they may be interchanged in position, the comparison of their length being made by observing the tilt (in end position of the objects being measured) of a gravity level of the glass tube, liquid and bubble type, making contact with the top sides or measuring faces of the standard and the article, in a manner hereafter described. When the radius of the level tube is large and the length of the base supporting it is small, each, however, well within practical limits, differences of height or length between the standard and article as small as one millionth of an inch can be detected.

*Example.*—As an example:—To generate sizes of 4", 3", 2", 1", 0.9", 0.8", 0.7", 0.6", 0.5", 0.4", 0.3", 0.2", 0.1," and 0.05". A standard of 25.6" could be used when eight gauges are made at once, as in our British application No. 141,770; then calling the length of standard S—

$$\frac{S}{8} = a = 3.2''$$

and $$\frac{4a}{8} = b = 1.6''$$

also $$\frac{2a}{8} = c = 0.8''$$

$$\frac{a}{8} = d = 0.4''$$

$$\frac{2a+c}{8} = 0.9''$$

$$\frac{a+b+c}{8} = 0.7''$$

$$\frac{a+b}{8} = 0.6''$$

$$\frac{a+c}{8} = 0.5''$$

$$\frac{a}{8} = 0.4''$$

$$\frac{b+c}{8} = 0.3''$$

$$\frac{b}{8} = 0.2''$$

$$\frac{c}{8} = 0.1''$$

$$\frac{d}{8} = 0.05''$$

And for the 1'', 2'' and 3'' gauges:—

$$\frac{2a+b}{8} = 1''$$

$$\frac{4a+2b}{8} = 2''$$

$$\frac{6a+3b}{8} = 3''$$

And for the 4'' gauge:—

$$\frac{4a+2b}{4} = 4''$$

In this last case only four of the eight gauges made are intercompared; firstly, the two sets of four gauges against each other for equality; and secondly one or both sets against the standard built up of four "$a$" and two "$b$" standard gauges, to compare for true size.

The accompanying drawings illustrate one convenient form of apparatus in accordance with the invention.

Figure 1:
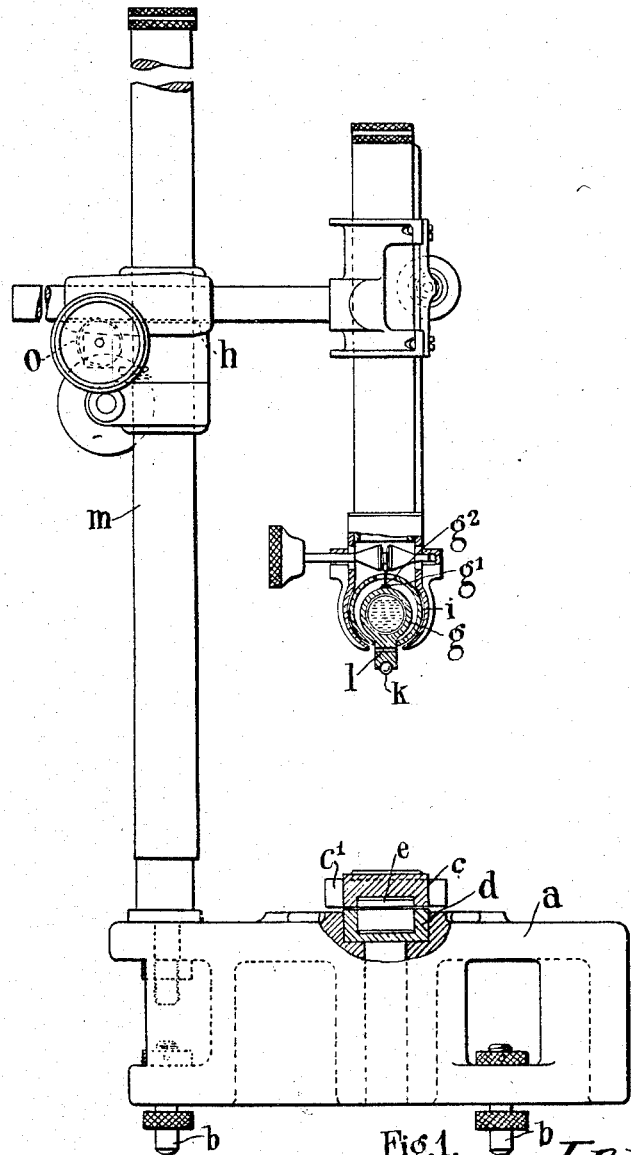
Figure 1 is a side elevation, partly in section.
Figure 2:
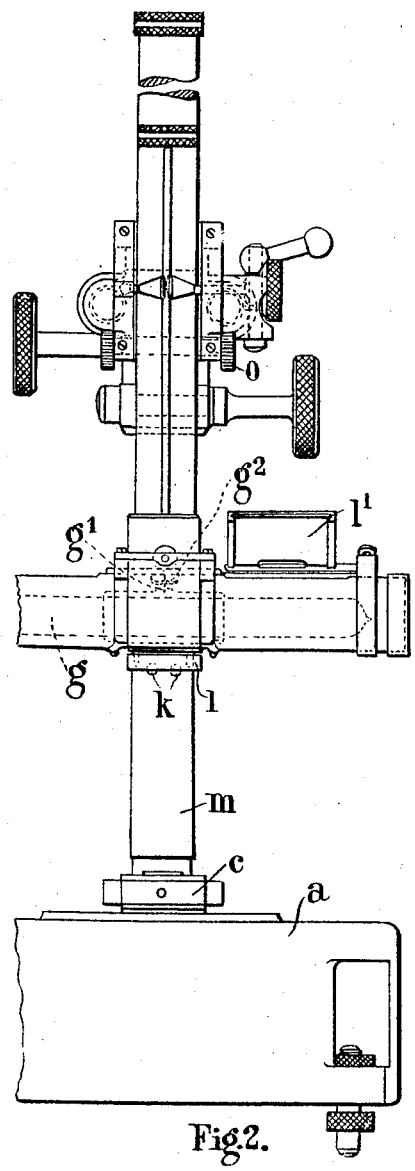
Figure 2 is a front elevation.
Figure 3:
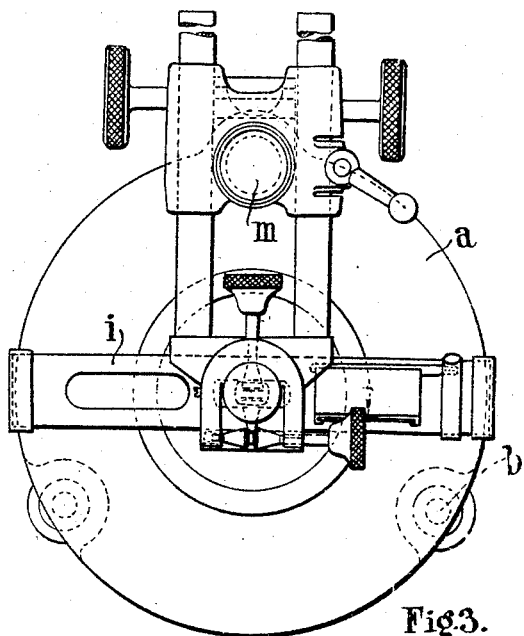
Figure 3 is a plan.
Figure 4:
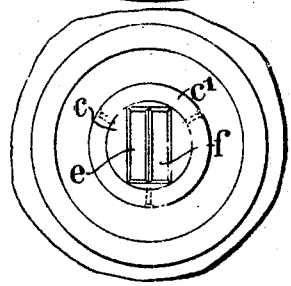
Figure 4 is a plan of the table.

In carrying our invention into effect in one convenient manner, we provide a suitable platform or support $a$ which may be provided with levelling screws $b$ and which preferably consists of a relatively large mass of metal of such size that the indications of the apparatus will not readily be interfered with by varying expansions, due to exterior variations of temperature, such as that due to the heat of the hand or body of an operator.

Upon the upper surface of the platform of relatively large mass, we rotatably mount a circular table $c$ which has a truly flat upper surface accurately parallel to a truly flat annular under surface mounted on a truly flat annular fitting $d$ mounted in recess in the support. By this or other suitable means the motion of the table is limited to one of almost pure rotation so that by this simple arrangement, consisting mainly of two flat surfaces, which can be easily made to the necessary high degree of accuracy, the upper surface of the rotating table $c$ is made to turn (as for example by means of the wooden or other ring $c'$) into any position in a true plane parallel to the surface of the platform on which it is mounted, thus obtaining a practically perfect interchange of position of the standard and the article between successive applications of the indicating level.

When used in conjunction with our before-mentioned method of manufacturing gauge slips, the rotatable table $c$ may be provided with two facets $e$, $f$, so that a suitable standard or combinations of standards may be wrung on one while a bundle of gauge slips finished approximately to the same total length as the standard are wrung on the other. A suitable gravity level $g$ is then placed upon the top of the standard and the gauge slips, and readings are taken on graduated scales at either or both ends of the level tube, the said scales not being shown but being well understood. If desired a mirror $l'$ may be employed for facilitating the reading of the scales. The table carrying the gauges being measured is then rotated so that the positions of the standard and the gauge slips relatively to the level are reversed. The level is once again placed in position, and a second observation made.

The difference between the two readings of the level gives the measure of the difference in length between the standard and the pile of gauge slips, and it will be seen whether the pile of gauge slips accurately compares with the standard or whether they are of larger dimensions than the standard, and in the latter case, they are once more submitted to a lapping process as described in the before-mentioned specification, and are again subjected to measurement by comparison, and so on, until they accurately correspond with the standard.

The glass level tube is preferably surrounded by, though not in actual contact with, a metal tube $i$ which serves to protect it from air currents, and to achieve stability the supporting base of the level may be made, for example, with a three-point support, of which two points rest upon the standard and one on the article to be measured, or conversely, on a two-point support and some form of auxiliary guide not introducing appreciable friction. Thus a wire $g'$ attached to the level and supported between two horizontal wires or rods $g^2$ answers the purpose extremely well. The supporting points may be hardened steel balls $k$ rigidly fixed in the supporting base $l$, a number of such supporting bases being, if necessary, interchangeably made in order to adapt the level for use with gauges, or piles of gauges, the distance apart of which during measurement is varied for any reason.

It is convenient, though not necessary, to provide the apparatus with a suitable stem or column $m$ from which the level may be suspended and manipulated in and out of use, it being understood that the suspending means must be such that the level will be free from restraint and practically out of contact with the supporting apparatus when actually in use. Racks $h$ and pinions $o$ or other suitable mechanism may be provided for moving the level horizontally in relation to the column $m$.

By means of the present invention combined with the prior process referred to, it is possible not only to obtain measurements to a much greater degree of accuracy than any hitherto obtainable by ordinary methods, but further it is possible to produce any number of sub-divisional standards from any one given primary standard.

An important advantage in measuring by this invention is that the disturbing effect of varying temperature is almost entirely eliminated by making the comparisons between the standards and the objects to be measured at the same instant, and under identically equal conditions, after both have been allowed to equalize to any ordinary air temperature. The complete measurements are then carried out without handling the standard or object once placed on the table.

In the manufacture of slip gauges this fact is highly valuable as the gauges can be compared accurately with standards at any ordinary workshop temperature, and when finished they will be true to size at the temperature at which the primary standard bar is true to its nominal size.

As the thermal expansion of steel is approximately 1/100,000 of an inch per inch for each degree centigrade rise in temperature, a comparison of length of 1/1,000,000 inch is only possible when temperature effects are largely eliminated, further emphasizing the value of a side-by-side instantaneous comparison method, where the temperature disturbance of the measuring machine itself is entirely eliminated and where the relative temperature disturbance of the objects compared is reduced to a minimum.

The invention is not to be limited to the foregoing details which are given by way of example only, as it consists broadly in the method of measurement by comparison between two positions of a level and any suitable means for achieving this purpose may be adopted.

Having now described our invention, what we claim as new and desire to secure by Letters Patent is:—

1. A method of measurement or standardization of lengths which comprises mounting two columns having flat and parallel end surfaces, one of which columns may be a standard vertically upon a table having a flat surface, comparing their lengths by means of a level provided with a base of finite length and adapted to rest upon the two columns simultaneously, rotating the table with the columns positioned thereon in the plane of the table through 180° in order to interchange the said columns in position relative to the level and again comparing them by means of the level by which manner of differential use of the level a zero reading is established without calibration.

2. Apparatus for the measurement or standardization of lengths comprising a table capable of accurately rotating in its own plane and upon which two or more columns with flat and parallel ends may be mounted vertically to be measured or compared, a level supported above said table and means for lowering said level into contact with said columns so that it rests thereon under the influence of gravity alone being restrained only from axial rotation.

3. Apparatus for the measurement or standardization of lengths comprising a base of relatively large mass, a table mounted on said base so as to be capable of accurately rotating in its own plane and upon which two or more columns with flat and parallel ends may be mounted vertically to be measured or compared, a level supported above said table and means for lowering said level into contact with said columns so that it rests thereon under the influence of gravity alone being restrained only from axial rotation.

4. Apparatus for the measurement or standardization of lengths comprising a base of relatively large mass, a member supported by said base having a truly flat annular surface, a table having a similarly truly flat lower surface rotatable on said first mentioned annular surface and having a truly flat upper surface parallel with its lower surface on which upper surface two or more columns of flat and parallel gauges to be measured or compared may be mounted vertically, a level supported above said table and means for lowering said level into contact with said columns so that it rests thereon under the influence of gravity alone being restrained only from axial rotation.

5. Apparatus according to claim 2 comprising an outer tube containing the level and such that the level will be out of contact with the tube when the level is brought to rest upon the columns so that it will rest thereon alone and be restrained only from axial rotation by the outer tube.

6. Apparatus for the measurement or standardization of lengths comprising a base of relatively large mass, means for horizontalizing said base, a table mounted upon said base for supporting two or more columns to be measured or compared and said table being capable of accurate rotation in its own plane, a standard carried upon said base, a level, means whereby said level is supported from said standard and means whereby said level may be brought into contact with said columns so that it rests thereon under the influence of gravity alone and is restrained only from axial rotation by said means.

In testimony whereof we have signed our names to this specification.

JOHN EDWARD SEARS, Jr.
ARTHUR JOHN CHARLES BROOKES.